US008104902B2

(12) United States Patent
Mao et al.

(10) Patent No.: US 8,104,902 B2
(45) Date of Patent: Jan. 31, 2012

(54) PROJECTION IMAGE DISPLAY APPARATUS HAVING A NOISE REMOVAL FILTER PORTION

(75) Inventors: Xiaolin Mao, Shenzhen (CN); Yanyun Yan, Shenzhen (CN); Xiangdong Liang, Shenzhen (CN); Xiangfei Kong, Shenzhen (CN); Yun Wang, Shenzhen (CN); Wanjun Zheng, Shenzhen (CN); Yi Guan, Shenzhen (CN); Yanshan Huang, Shenzhen (CN); Toshihiro Saruwatari, Osaka (JP); Shoji Okazaki, Osaka (JP); Tadashi Renbutsu, Hyogo (JP)

(73) Assignees: SANYO Electric Co., Ltd., Moriguchi (JP); Sanyo Technology Center (Shenzhen) Co., Ltd., Shenzhen (CN)

( * ) Notice: Subject to any disclaimer, the term of this patent is extended or adjusted under 35 U.S.C. 154(b) by 724 days.

(21) Appl. No.: 12/098,086

(22) Filed: Apr. 4, 2008

(65) Prior Publication Data
US 2008/0246929 A1 Oct. 9, 2008

(30) Foreign Application Priority Data

Apr. 5, 2007 (CN) .......................... 2007 1 0100528

(51) Int. Cl.
*G03B 21/14* (2006.01)
*G03B 21/22* (2006.01)
*H04N 5/217* (2011.01)

(52) U.S. Cl. ....................................... 353/119; 348/241

(58) Field of Classification Search .................. 353/119; 348/241
See application file for complete search history.

(56) References Cited

FOREIGN PATENT DOCUMENTS

| CN | 1607416 A | 4/2005 |
|---|---|---|
| JP | 08-306480 A | 11/1996 |
| JP | 10-186513 A | 7/1998 |

OTHER PUBLICATIONS

English translation of Chinese Office Action dated Jul. 24, 2009, issued in corresponding Chinese Patent Application No. 200710100528.6.

*Primary Examiner* — Georgia Y Epps
*Assistant Examiner* — Danell L Owens
(74) *Attorney, Agent, or Firm* — Westerman, Hattori, Daniels & Adrian, LLP

(57) ABSTRACT

In a projection image display apparatus, a noise removal filter portion 15 is separated from a power source unit body 14. The separated noise removal filter portion 15 is provided in the vicinity of a side wall of a housing on which a power source inlet is provided, and of the power source unit body 14, respectively. Specifically, the power source unit body 14 is provided along a side wall of a front face of the horizontally-long housing of the projection image display apparatus and the noise removal filter portion 15 is provided in a position opposed to the power source unit body 14 in a side wall of the back face. As a result, even when a light source lamp has a higher output, the projection image display apparatus can achieve reduced noise by an improved cooling capability and reduced cost enabled by an efficient Electro Magnetic Compatibility (EMC) measure and the like.

3 Claims, 12 Drawing Sheets

PROJECTION IMAGE DISPLAY APPARATUS HAVING A NOISE REMOVAL FILTER PORTION

FIELD OF THE INVENTION

The present invention relates to a projection type image display apparatus that has a noise removal filter portion for removing noise coming via a power source inlet and that includes a power source unit for supplying power to the respective parts including a light source lamp stored in a housing.

BACKGROUND OF THE INVENTION

A projection type image display apparatus such as a liquid crystal projector uses, as a light source lamp, a high-pressure mercury lamp, metal halide lamp, and the like that are driven with a high voltage to emit light with high intensity. Thus, this projection type image display apparatus includes a power source unit that includes a power source circuit substrate including circuit components for supplying power to the respective parts of the apparatus and a ballast circuit substrate having thereon circuit components for supplying power exclusive to a light source lamp. This power source unit includes a noise removal filter portion for removing noise coming via a power source inlet.

Japanese Patent Application Laid-Open Publication No. H10-186513 discloses a projection type image display apparatus in which a noise removal filter portion is provided on a circuit substrate of a power source unit.

A projection type image display apparatus such as a liquid crystal projector has been required to realize higher intensity enabled by a higher output of a light source lamp and reduction in cost and size of the apparatus. Such a light source lamp having a higher output requires a power source unit to have a higher output.

In the case of the apparatus having a small output, there is no problem in the structure as in the above-described conventional technique in which a noise removal filter is provided on a circuit substrate of a power source unit. However, the larger output the apparatus requires, the larger the power source unit becomes, because the power source unit requires a noise removal filter portion having a core (coil) that cannot be downsized.

A power source unit having a larger size causes a fan for cooling this power source unit to have a larger size or a higher output (rotating speed), resulting in a deteriorated cooling capability and increased noise.

To prevent this, an arrangement may be considered in which the noise removal filter portion is separated from the apparatus. However, this arrangement is disadvantageous in that noise easily enters a connecting wire to cause an increased use of a core, which raises a difficult problem of an Electro Magnetic Compatibility (EMC) measure, thereby causing a higher cost.

SUMMARY OF THE INVENTION

The present invention has been made in order to solve the disadvantage as described above. It is an objective of the invention to provide a projection type image display apparatus that includes a power source unit light that can realize, even when a light source lamp has a higher output, reduced noise enabled by an improved cooling capability and a reduction in cost enabled by an EMC measure and the like.

In order to achieve the above objective, the present invention provides a projection type image display apparatus that has a noise removal filter portion for removing noise coming via a power source inlet and that includes a power source unit for supplying power to the respective parts including a light source lamp stored in a housing. The projection type image display apparatus modulates light emitted from the light source lamp based on an image signal to project the modulated image light in an expanded manner. The noise removal filter portion is separated from the body of the power source unit. The separated noise removal filter portion is provided in the vicinity of a side wall of the housing on which a power source inlet is provided and the body of the power source unit, respectively.

According to this configuration, the noise removal filter portion is separated from the body of the power source unit and the separated noise removal filter portion is provided in the vicinity of the side wall of the housing on which the power source inlet is provided, and of the body of the power source unit, respectively. This configuration can downsize the body of the power source unit even when the light source lamp has a higher output. Thus, reduced noise enabled by the improved cooling capability can be achieved and the connecting wire can be the minimum length to provide reduced cost enabled by an efficient EMC measure (e.g., reduced use of a core).

In this case, the noise removal filter portion is preferably provided in the vicinity of the side wall of the housing on which the power source inlet is provided and the body of the power source unit, respectively.

By the above configuration, the side wall of the housing is free from a power source code. Thus, the effect of the above-described reduced cost can be obtained without deteriorating the usability of the side face of the housing.

The body of the power source unit is preferably provided along the side wall of the front face of the horizontally-long housing and the noise removal filter portion is preferably provided in a position opposed to the body of the power source unit in the side wall of the back face.

By the structure as described above, the connecting wire can have the minimum length even when the noise removal filter portion is provided along the side wall of the back face. Thus, the effect of the above-described reduced cost can be obtained without causing a complicated arrangement of the respective components in the housing.

DETAILED DESCRIPTION OF THE PREFERRED EMBODIMENT

One embodiment of the present invention will now be described below in detail with reference to the drawings.

Figure 1:
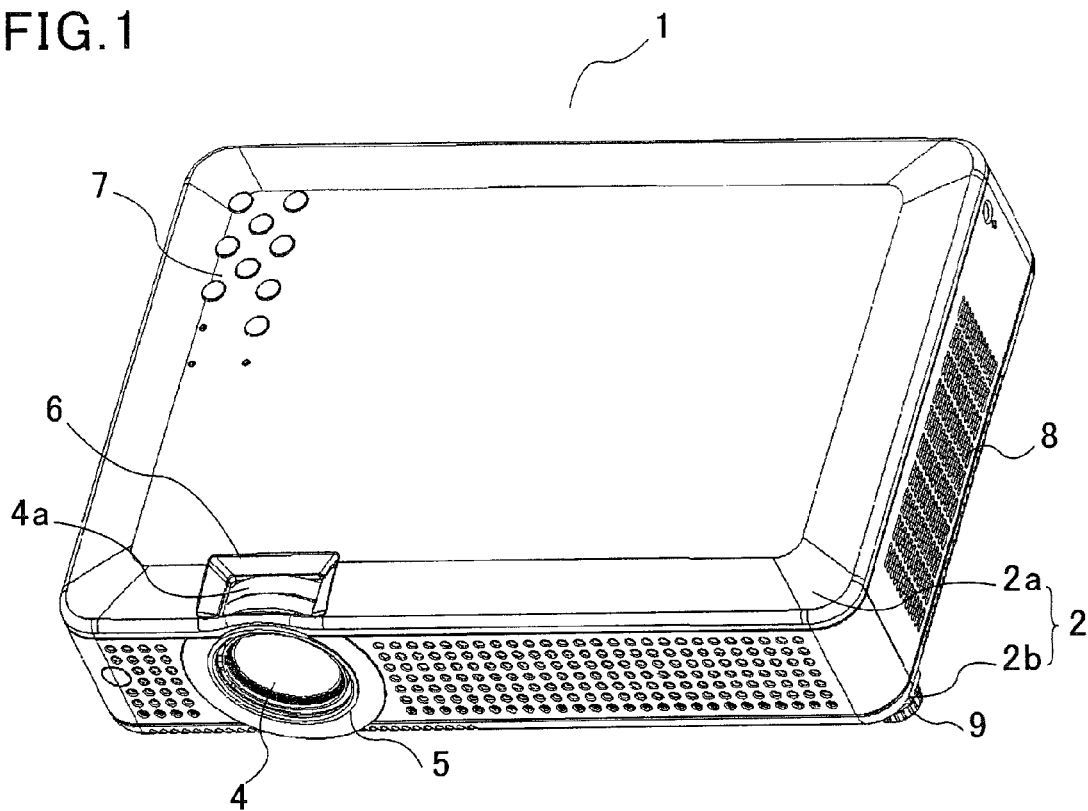
FIG. 1 is a perspective view of a liquid crystal projector according to one embodiment of a projection type image display apparatus of the present invention, obliquely seen from above from the front side.
Figure 2:
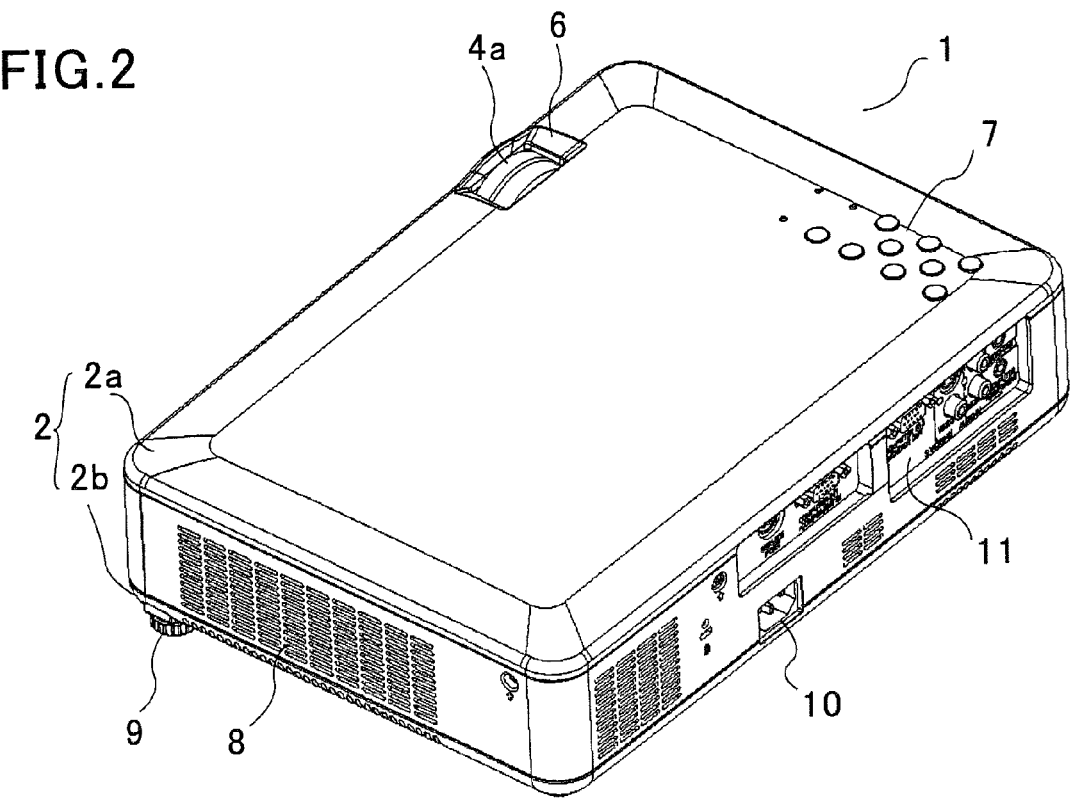
FIG. 2 is similarly a perspective view obliquely seen from above from the back side.
Figure 3:
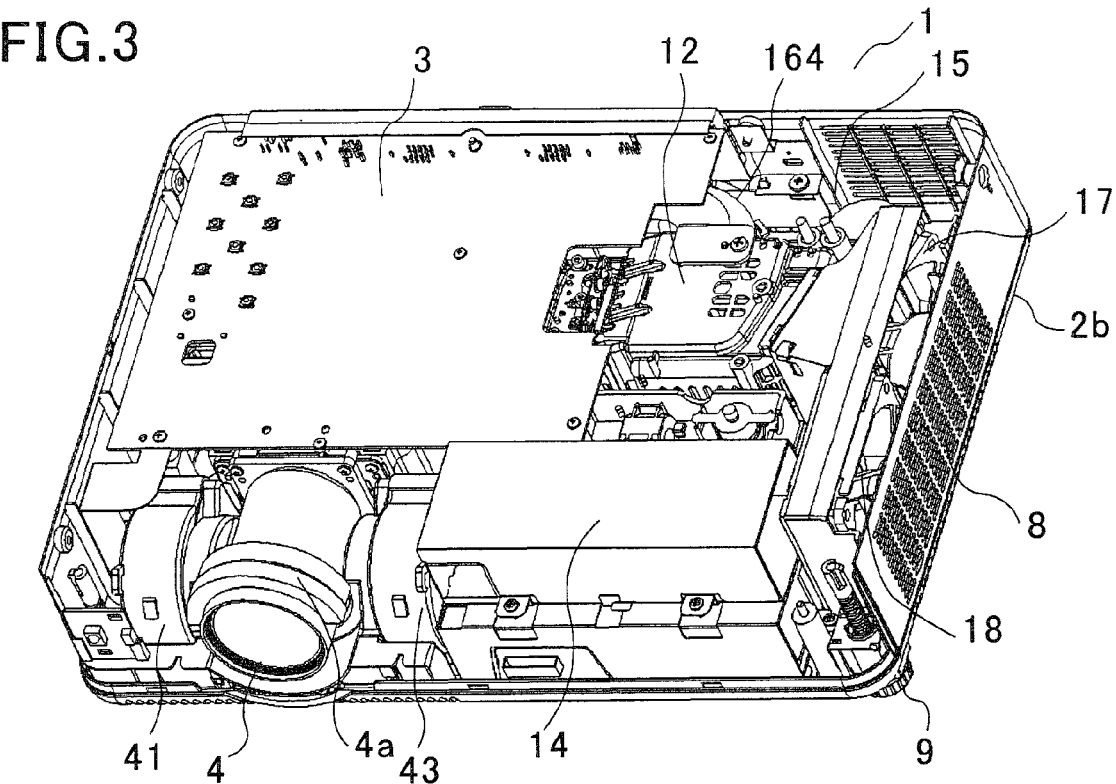
FIG. 3 is a perspective view in which an upper case in FIG. 1 is removed.
Figure 4:
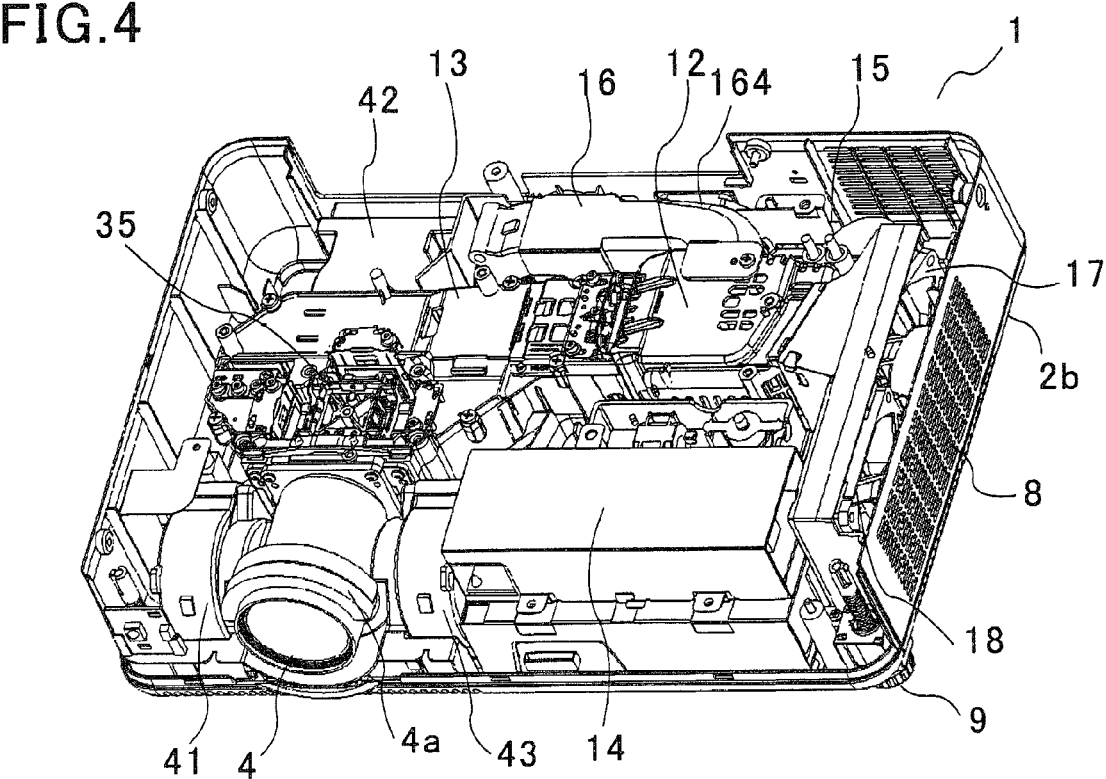
FIG. 4 is a perspective view in which a main control substrate is further removed.
Figure 5:
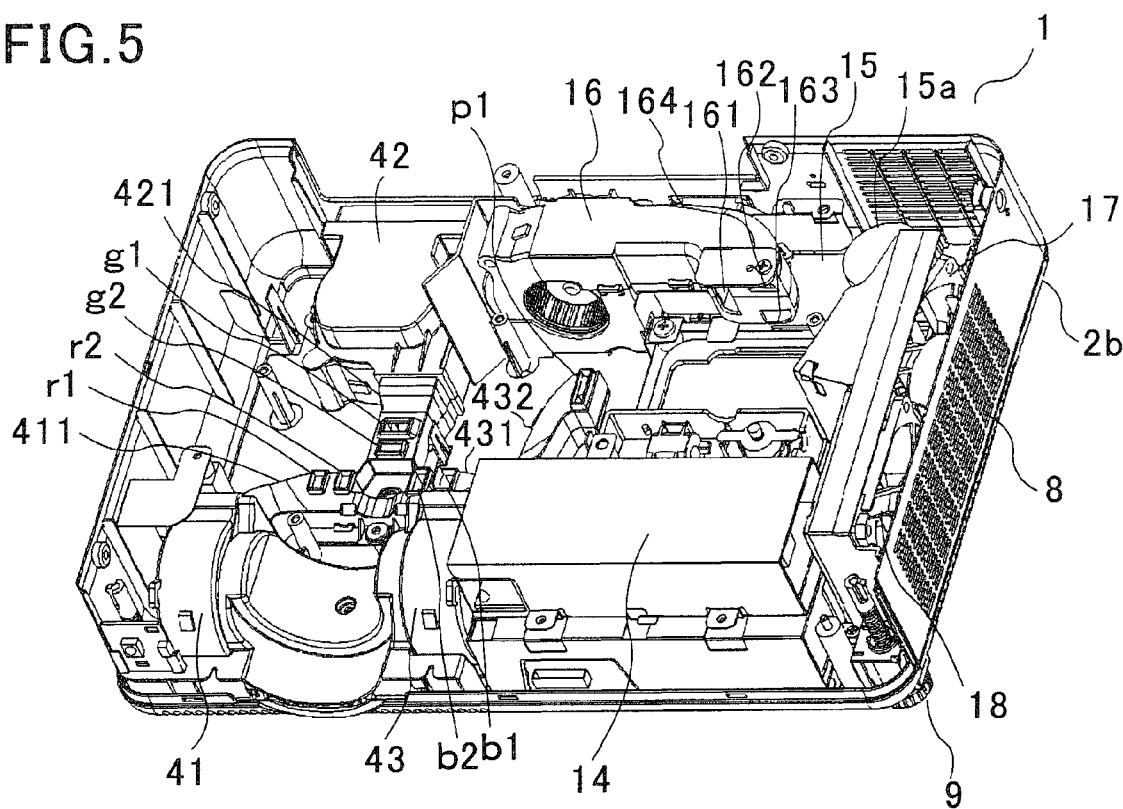
FIG. 5 is a perspective view in which an optical system is further removed.
Figure 6:
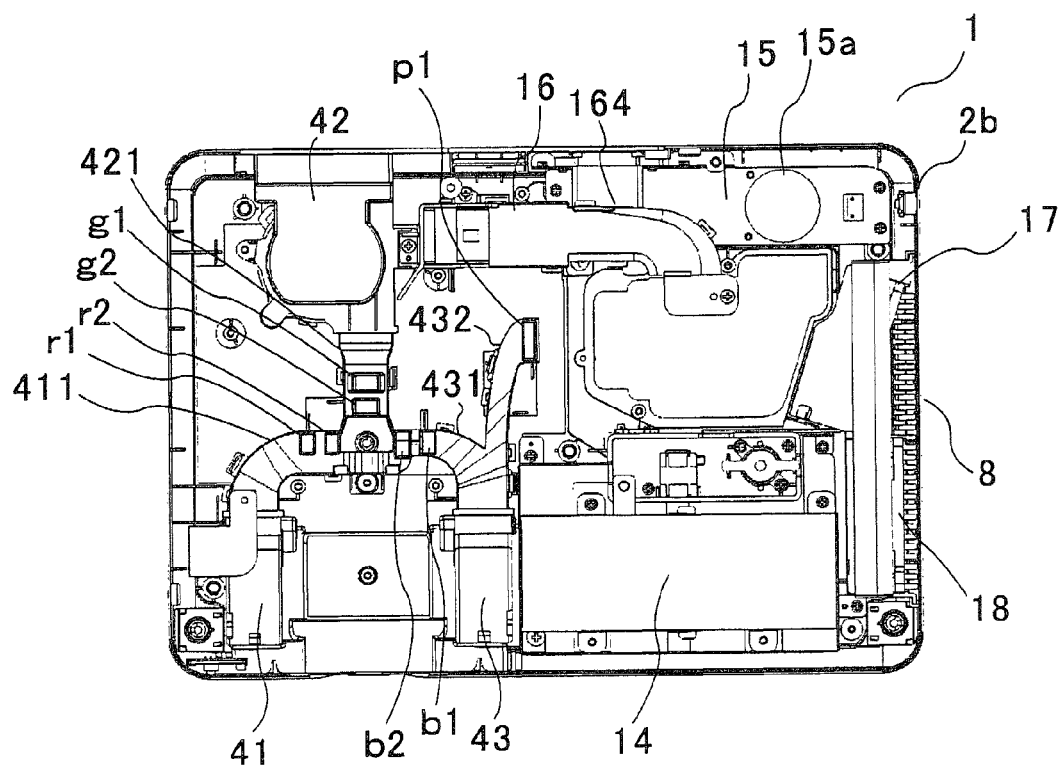
FIG. 6 is a top plan view of FIG. 5.

FIG. 1 is a perspective view of a liquid crystal projector as one embodiment of a projection type image display apparatus according to the present invention seen obliquely from above from the front side, FIG. 2 is similarly a perspective view seen obliquely from above from the back side, FIG. 3 is a perspective view in which the upper case in FIG. 1 is removed, FIG. 4 is a perspective view in which a main control substrate is further removed, FIG. 5 is a perspective view in which an optical system is further removed, and FIG. 6 is a top plan view of FIG. 5.

As shown in FIGS. 1 and 2, a housing 2 forming an outer hull of this liquid crystal projector 1 is compact, has a horizontally long thin rectangular shape, and consists of an upper case 2a and a lower case 2b. When the upper case 2a and a main control substrate 3 are removed, the interior thereof is displayed as shown in FIG. 4.

The left side seen from the front side of the front wall of the upper case 2a is formed with a projection window 5, from which a projection lens 4 is exposed. The left side front portion of the upper surface of the upper case 2a is formed with an operation window 6, from which an adjustable dial 4a that adjusts zooming and focusing of the projection lens 4 corresponding to the projection window 5 is exposed. The left side back portion of the upper surface of the upper case 2a is provided with an operation display portion 7.

On the other hand, the right side wall of the lower case 2b seen from the front side is formed with a plurality of slit-like exhaust holes 8. Both side corner portions of the bottom front portion of the lower case 2b are provided with leg portions 9 adjustable in height. On the backside wall of the lower case 2b, a power source inlet 10 connected to a power source plug and an inlet and outlet terminal group 11 to connect various types of input and output cables are exposed.

Inside the housing 2, as shown in FIGS. 3 and 4, looking from the front side, the right side inner portion is disposed with a light source unit 12, and at the same time, an optical system 13 reaching the projection lens 4 from the light source unit 12 is disposed approximately in L-shape. In front of the light source unit 12, a power source main body 14 stored with a power source circuit substrate mounted with the circuit parts to feed a power source to each portion of the apparatus and a ballast circuit substrate mounted with circuit parts to feed the power supply exclusively to the light source lamp is disposed, and in the back of the light source unit 12, a noise removal filter portion 15 to remove the noise infiltrating through the power source inlet 10 is disposed.

In the present embodiment, the noise removal filter portion 15 is separated from the power source unit main body 14, and at the same time, the separated noise removal filter portion 15 is disposed to be positioned as closely as possible to the housing back side wall provided with the power source inlet 10 and the power source unit main body 14. Specifically, along the front side wall of the horizontally long house 2, the power source unit main body 14 is disposed, and at the position opposite to the power source unit main body 14 in the back side wall, the noise removal filter portion 15 mounted with a core (coil) 15a and the like on the substrate is disposed along the back side wall.

On the other hand, at the back side in an irradiating direction of the light source unit 12, a suction fan 16 composed of a sirocco fan as a first fan including the light source lamp cooling mechanism is disposed, and at the lateral side, an exhaust fan 17 composed of an axial fan as a second fan constituting the light source lamp cooling mechanism is disposed.

At the lateral side of the power source unit main body 14, an exhaust mechanism is provided. This exhaust mechanism is configured such that an exhaust fan 18 composed of the axial fan as a second exhaust fan is horizontally disposed side by side with the exhaust fan 17. Incidentally, the exhaust fan 17 as the second fan constituting the light source lamp cooling mechanism serves as the first exhaust fan constituting the exhaust mechanism.

Figure 7:
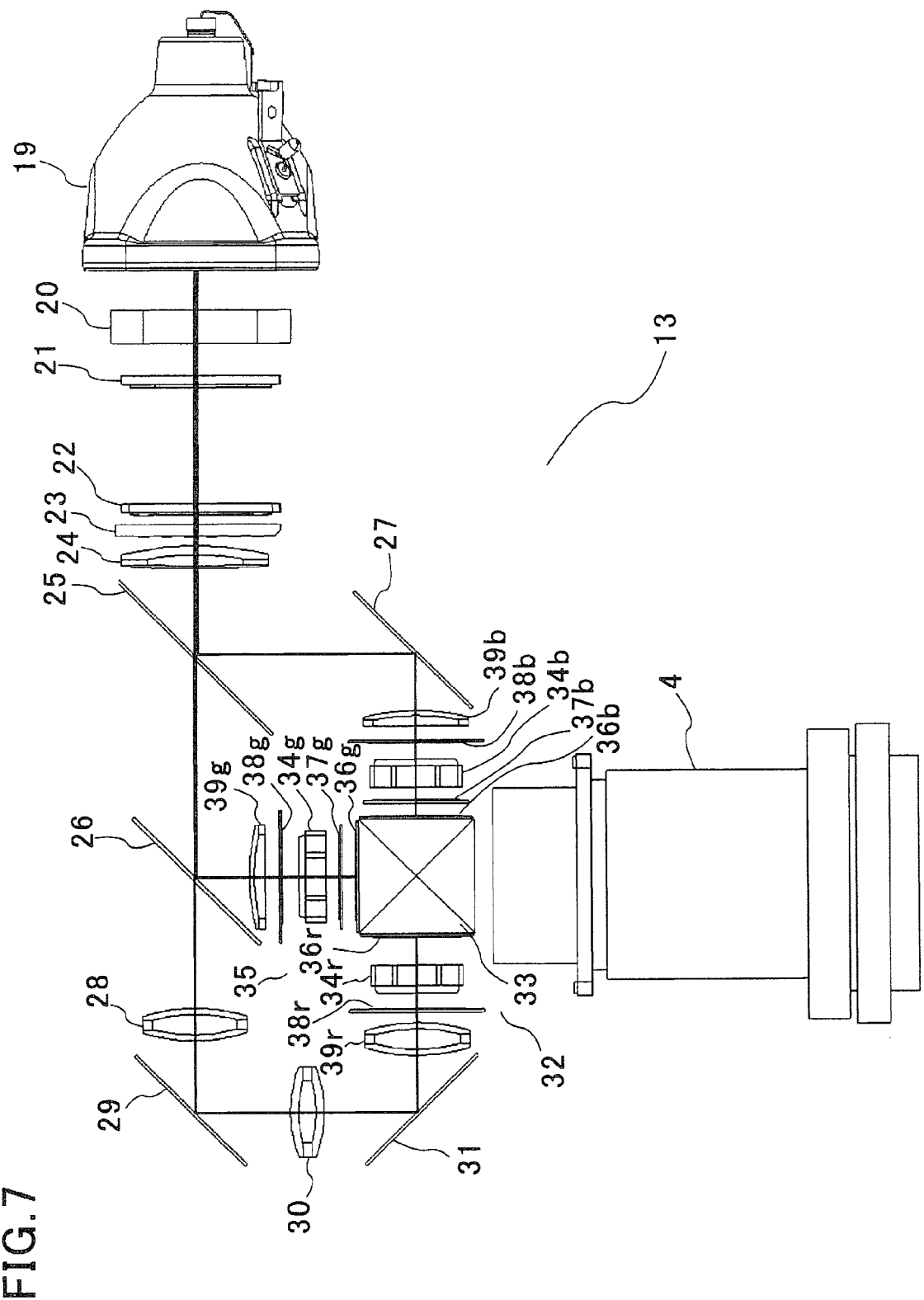
FIG. 7 is a view showing a configuration example of an optical system.

FIG. 7 is a view showing a configuration example of the optical system 13. Incidentally, the optical system 13 is not limited to the one shown in FIG. 7 and the present invention can be applied to the apparatus provided with various types of optical systems.

In FIG. 7, a white light from the light source lamp 19 passes through a condenser lens 20, a first integrator lens 21, a second integrator lens 22, a polarizing beam splitter (PBS) 23, and a condenser lens 24 or the like, and is irradiated at a first dichroic mirror 25.

The first integrator lens 21 and the second integrator lens 22 are configured by the fly-eye lenses composed of a plurality of lens cells disposed in a matrix array, and have functions to equalize the illumination distribution of the white light emitted from the light source lamp 19.

The polarizing beam splitter (PBS) 23 includes a polarizing separation membrane and a phase retardation plate (½ wave plate). The polarizing separation membrane allows, from among the light from the second integrator lens 22, for example, a P polarization to transmit, and an S polarization slightly to change the light path and emit. The P polarization light having transmitted the polarization separation membrane is converted into the S polarization by the phase retardation plate provided in the front side (light emitting side) thereof, and is emitted. That is, almost all the lights are aligned by the S polarization.

The light having passed through the polarizing beam splitter 23 passes through a condenser lens 24, and reaches the first dichroic mirror 25. The first dichroic mirror 25 reflects a blue component only of the light, and at the same time, has a function to allow red and green components to pass through, and the passing light of the red and green components reaches a second dichroic mirror 26. The second dichroic mirror 26 reflects a green component of the light, and at the same time, has a function to allow the red component to pass through.

Consequently, the white light emitted from the light source lamp 19 is divided into the blue light, the green light, and the red light by the first and second dichroic mirrors 25 and 26.

The blue light reflected by the first dichroic mirror 25 is reflected by a total reflection mirror 27, and the green light reflected by the second dichroic mirror 26 is as it is, and the red light having passed the second dichroic mirror 26 is reflected by total reflection mirrors 29 and 31 via relay les 28 and 30, and these are guided to an image generating optical system 32, respectively.

The image generation optical system 32 is detachably disposed with a prism assembly part 35 (see FIG. 4) fitted with a liquid crystal panel 34r for the red color, a liquid crystal panel 34g for the green color, a liquid crystal panel 34b for the blue color, and the like, respectively, at the three lateral sides of a cube-shaped color synthesis prism 33. Between the color synthesis prism 33 and the liquid crystal panel 34r for the red color, an outgoing side polarizing plate 36r is disposed, and between the color synthesis prism 33 and the liquid crystal panel 34g for the green color, an outgoing side polarizing plate 36g and a fronting polarizing plate 37g are disposed, and between the color synthesis prism 33 and the liquid crystal panel 34b for the blue color, an outgoing side polarizing plate 36b and a fronting polarizing plate 37b are disposed. At the incident sides of three pieces of the liquid crystal panels 34r, 34g, and 34b, incident side polarizing plates 38r, 38g, and 38b, and condenser lenses 39r, 39g, and 39b are disposed, respectively.

Consequently, the blue light reflected by the first dichroic mirror 25 and the total reflection mirror 27 is guided to the condenser lens 39b for the blue color, and reaches the color synthesis prism 33 by passing through the incident side polarizing plate 38b, the liquid crystal panel 34b for the blue color and the fronting polarizing plate 37b, and the outgoing side polarizing plate 36b. The green light reflected by the second dichroic mirror 26 is guided to the condenser lens 39g for green color, and reaches the color synthesis prism 33 by passing through the incident side polarizing plate 38g, the liquid crystal panel 34g for the green color and the fronting polarizing plate 37g, and the outgoing side polarizing plate 36g. Likewise, the red color light transmitting the first dichroic mirror 25 and the second dichroic mirror 26, and reflected by two pieces of the total reflection mirrors 29 and 31, is guided to the condenser lens 39r for the red color, and reaches the color synthesis prism 33 by passing through the incident side polarizing plate 38r, the liquid crystal panel 34r for the red color and the outgoing side polarizing plate 36r.

Three colors of image light guided by the color synthesis prism 33 is synthesized by this color synthesis prism 33, and the color image light obtained by this synthesis passes through the projection lens 4, thereby to be enlargedly projected onto a frontward screen.

Figure 8:
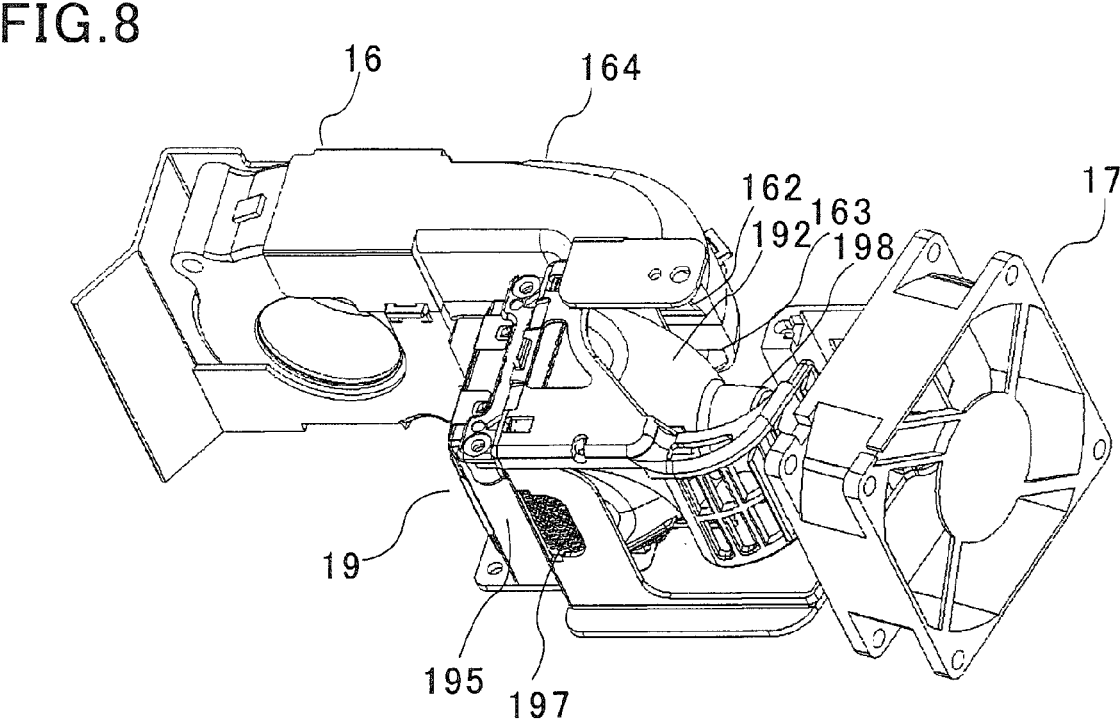
FIG. 8 is an enlarged view of principal parts showing a light source lamp cooling mechanism in the present embodiment, and is also a perspective view obliquely seen from above from the front side.
Figure 9:
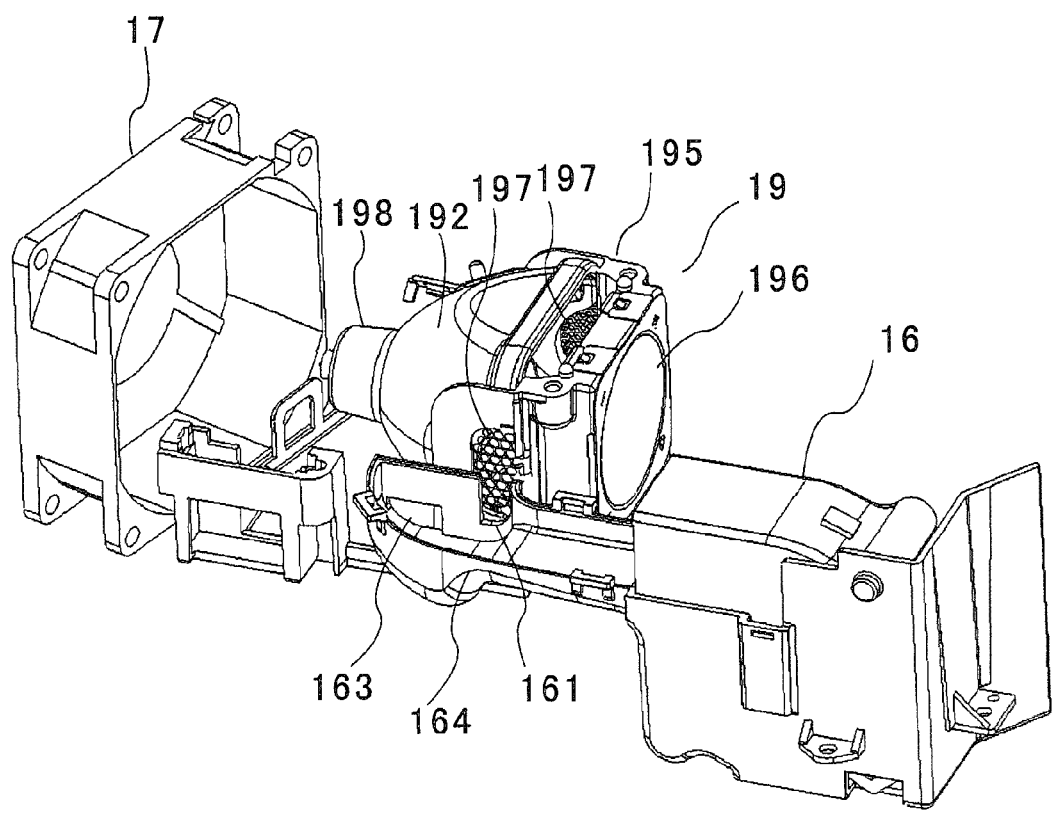
FIG. 9 is similarly a perspective view in which an upper half of a duct is removed and obliquely seen from above from the back side.
Figure 10:
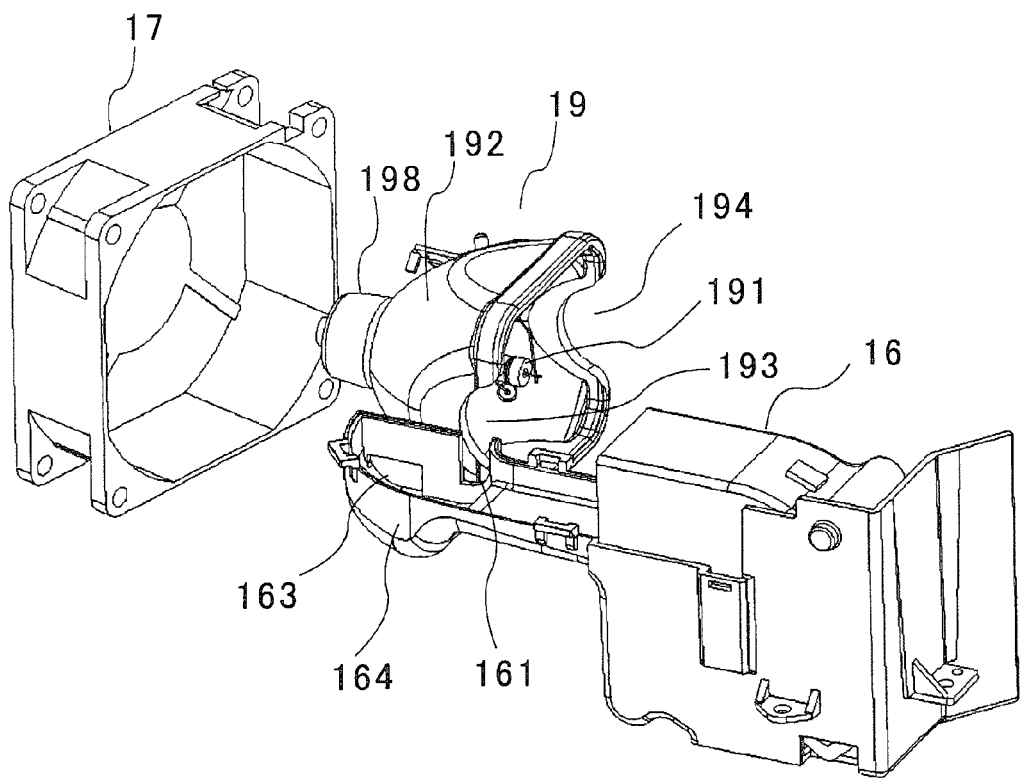
FIG. 10 is a perspective view in which a holder of the light source lamp in FIG. 9 is removed.
Figure 11:
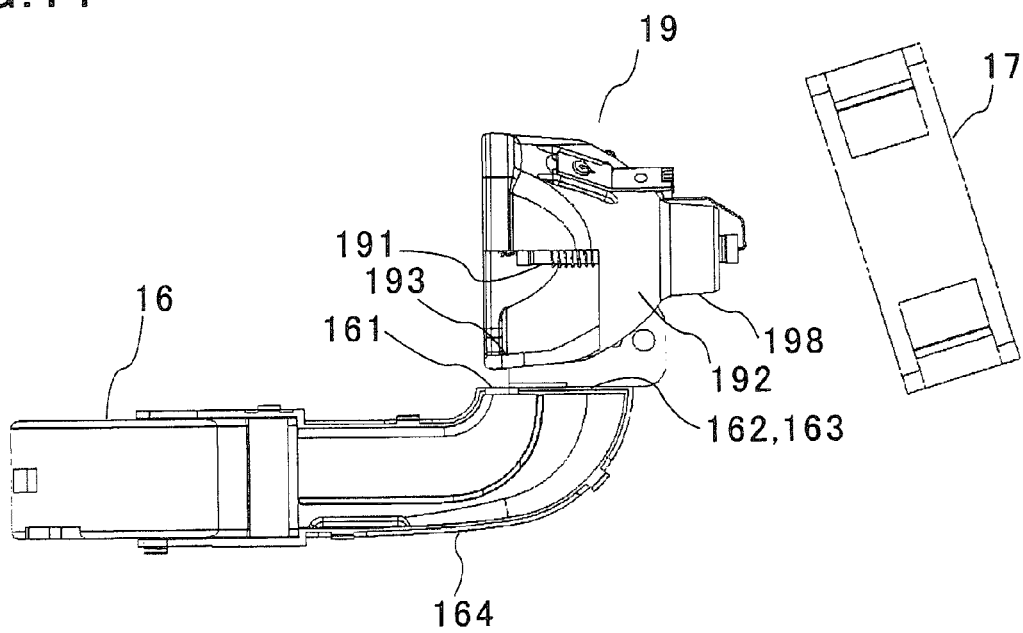
FIG. 11 is a cross-sectional view of the principal parts seen from the back side.

FIGS. 8 to 11 are enlarged views of principal parts showing the light source lamp cooling mechanism in the present embodiment. FIG. 8 is a perspective view of the front side seen obliquely from above, and FIG. 9 is a perspective view of the back side seen obliquely from above in which an upper half of a duct is removed. FIG. 10 is a perspective view in which a holder of the light source lamp in FIG. 9 is removed, and FIG. 11 is a cross-sectional view of the principal parts seen from the back side.

The light source lamp 19 of the present embodiment has an arc tube 191 composed of a high-pressure mercury lamp, the metal-halide lamp, and the like, and a reflector 192 disposed so as to cover this arc tube 19 and formed in the inner surface with a paraboloidal reflecting surface and opened in the front surface. This reflector 192, as shown in FIG. 10, is formed with a suction port 193 and an exhaust port 194 opposed to each other on the front surface opening edge.

The light source lamp 19 thus configured is loaded on a lamp holder 195 made of aluminum as shown in FIGS. 8 and 9. This aluminum lamp holder 195 is configured to be provided with a heat-resisting glass plate 196 blocking a front surface opening of the reflector 192, and at the same time, formed with a ventilation wire netting 197 composed of a large number of small holes corresponding to the suction port 193 and the exhaust port 194 of the reflector 192, so that the fragment does not fly in all directions when the arc tube 191 is burst.

The conventional light source lamp cooling mechanism is disposed with the fan and the discharge portion in consideration of the cooling only of the light source lamp, and therefore, even when the cooling of the light source lamp is performed, by that much, the exhaust temperature increases. The projection type image display apparatus such as the liquid crystal projector has come to require a raised output of the light source lamp and the miniaturization of the apparatus all together, and in the conventional art as explained above, even if the cooling of the light source lamp of a high output can be performed, the exhaust temperature exceeds a permissible zone of the user and increases too much, thereby making it difficult to achieve both the cooling of the light source lamp and a reduction in the exhaust temperature. As its countermeasure, when the output (the number of rotations) of the fan is increased, the noise of the fan is increased.

Hence, the present embodiment includes, as a fan to cool the light source lamp 19, the suction fan (first fan) 16 having the inner discharge port 161 sending the air through the suction port 193 formed in the reflector 192 inside the light source lamp 19 and the outer discharge ports 162 and 163 sending the air to the outer surfaces of the reflector 192, and the exhaust fan (second fan) 17 exhausting an exhaust air around the light source lamp 19 to the outside through an exhaust hole 8 formed in the side wall of the housing 2. The suction fan 16 is composed of the sirocco fan, and the exhaust fan 17 is composed of the axial fan.

The outer discharge ports 162 and 163 of the suction fan 16 are formed by deviating from the outer surface center portion of the reflector 192 of the light source lamp 19, and at the same time, the exhaust fan 17 is disposed inclined such that its suction direction is directed toward the outer discharge ports 162 and 163 of the suction fan 16.

Each of the discharge ports 161, 162, and 163 circularly bends the distal end of the duct 164 to the light source lamp 19 side and is formed on its distal end, the duct 164 extending to the lateral side of the light source lamp 19 from the suction fan 16 disposed at the lateral side in the irradiation direction of the light source lamp 19. An inner discharge port 161 is formed by corresponding to a suction port 193 formed in the reflector 192 of the light source lamp 19, while the outer discharge ports 162 and 163 are formed above and below two pieces by deviating vertically from the outside surface center portion of the reflector 192 of the light source lamp 19.

As explained above, the degree of deviating the outer discharge ports 162 and 163 of the suction fan 16 from the outside surface center portion and the degree of inclining the exhaust fan 17 such that its suction direction is directed to the outer discharge ports 162 and 163 of the suction fan 19 are set in consideration of the cooling of the light source lamp 19 and the exhaust temperature.

By being thus configured, the interior of the light source lamp 19 having the arc tube 191 reaching the highest temperature can be effectively cooled by using the inner discharge port 161 of the suction fan 16. The outer surface (including a neck portion 198 projected from its back end) of the reflector 192 of the light source lamp 19, which does not reach the temperature high enough as the interior of the light source lamp 19, can be suitably cooled by using the outer discharge ports 162 and 163 of the suction fan 16 formed by deviating from the outer surface center portion.

Since the exhaust fan 17 is disposed inclined such that its suction direction is directed to the outer discharge ports 162 and 163 of the suction fan 16, the air from the outer discharge ports 162 and 163 of the suction fan 16 formed by deviating from the outer surface center portion of the light source lamp 19 cools the outer surface of the light source lamp 19, and at the same time, a part of the air is directly sucked into the exhaust fan 17, and is mixed with the exhaust air increased in temperature by having cooled the interior of the light source lamp 19, and is exhausted to the outside, thereby reducing the exhaust temperature.

Consequently, without increasing the outputs of the suction fan 16 and the exhaust fan 17 so much, the cooling of the light source lamp 19 and the reduction in the exhaust temperature can be both achieved, so that the noise can be also suppressed low.

Further, by forming the outer discharge ports 162 and 163 of the suction fan 16 above and below two pieces by deviating from the outer surface center portion of the light source lamp 19, the outer surface of the light source lamp 19 can be approximately equally cooled.

The degree of deviating each of the discharge ports 161 and 162 of the suction fan 16 from the outer surface center portion of the light source lamp 19 and the degree of inclining the exhaust fan 17 such that its suction direction is directed toward the outer discharge ports 162 and 163 of the suction fan 16 are set in consideration of the cooling of the light source lamp 19 and the exhaust temperature, and therefore, the cooling of the light source lamp 19 and the reduction in exhaust temperature can be both flexibly achieved in conformity with the raised output of the light source lamp 19, the miniaturization of the apparatus, and the like.

Further, each of the discharge ports 161, 162, and 163 of the suction fan 16 is formed in the duct 164 extended from the suction fan 16 to the light source lamp 19, so that a degree of freedom of the positioning of the suction fan 16 is improved.

Thus, according to the present embodiment, since the light source lamp cooling mechanism as explained above is provided, so that, without increasing the outputs of the fans 16 and 17 so much, the liquid crystal projector 1 capable of achieving the cooling of the light source lamp 19 and the reduction of the exhaust temperature as well as reducing the noise can be realized.

Figure 12:
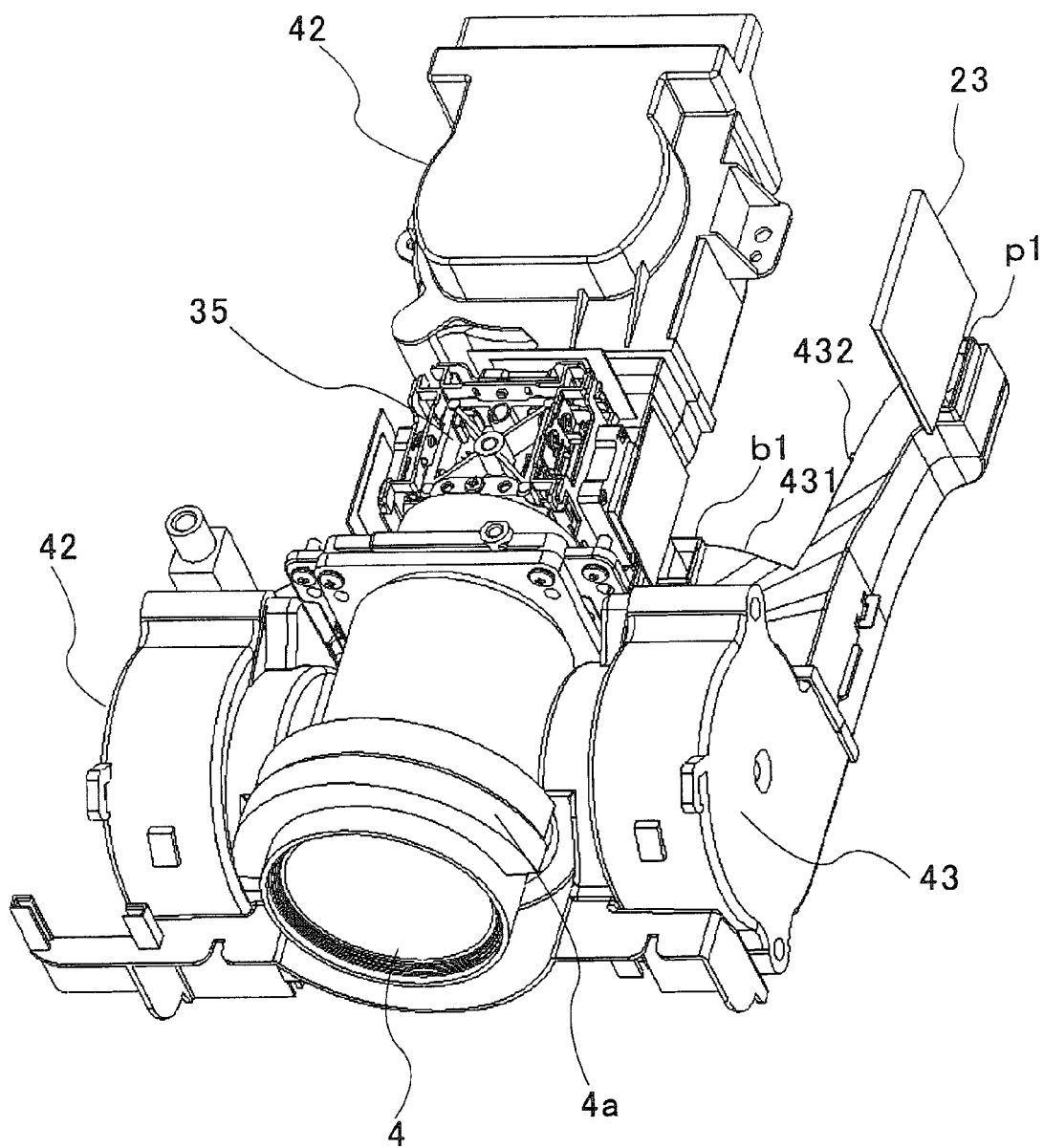
FIG. 12 is an enlarged view of the principal parts showing an optical part cooling mechanism in the present embodiment, and is also a perspective view obliquely seen from above from the front side.
Figure 13:
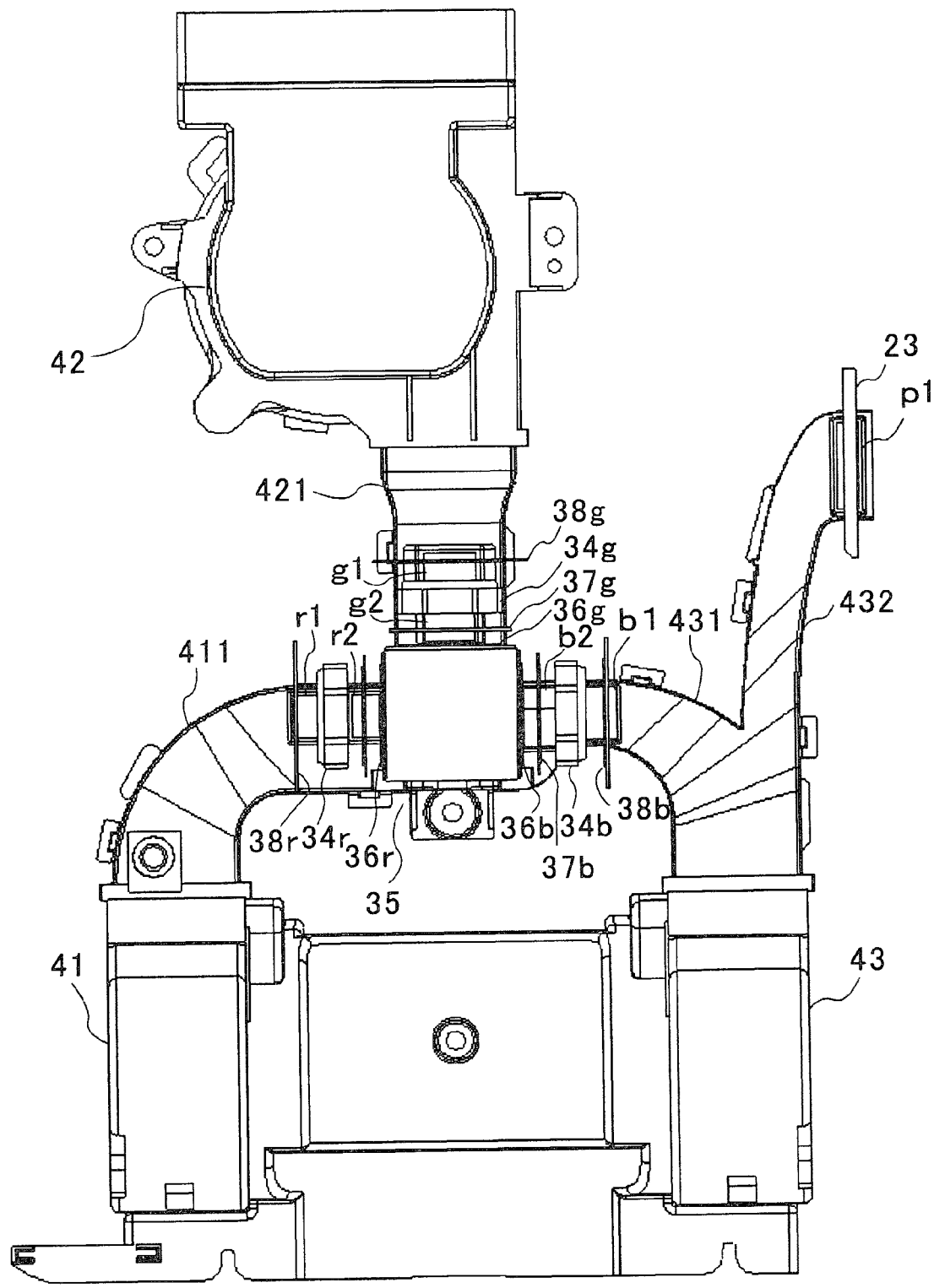
FIG. 13 is similarly a top plan view.
Figure 14:
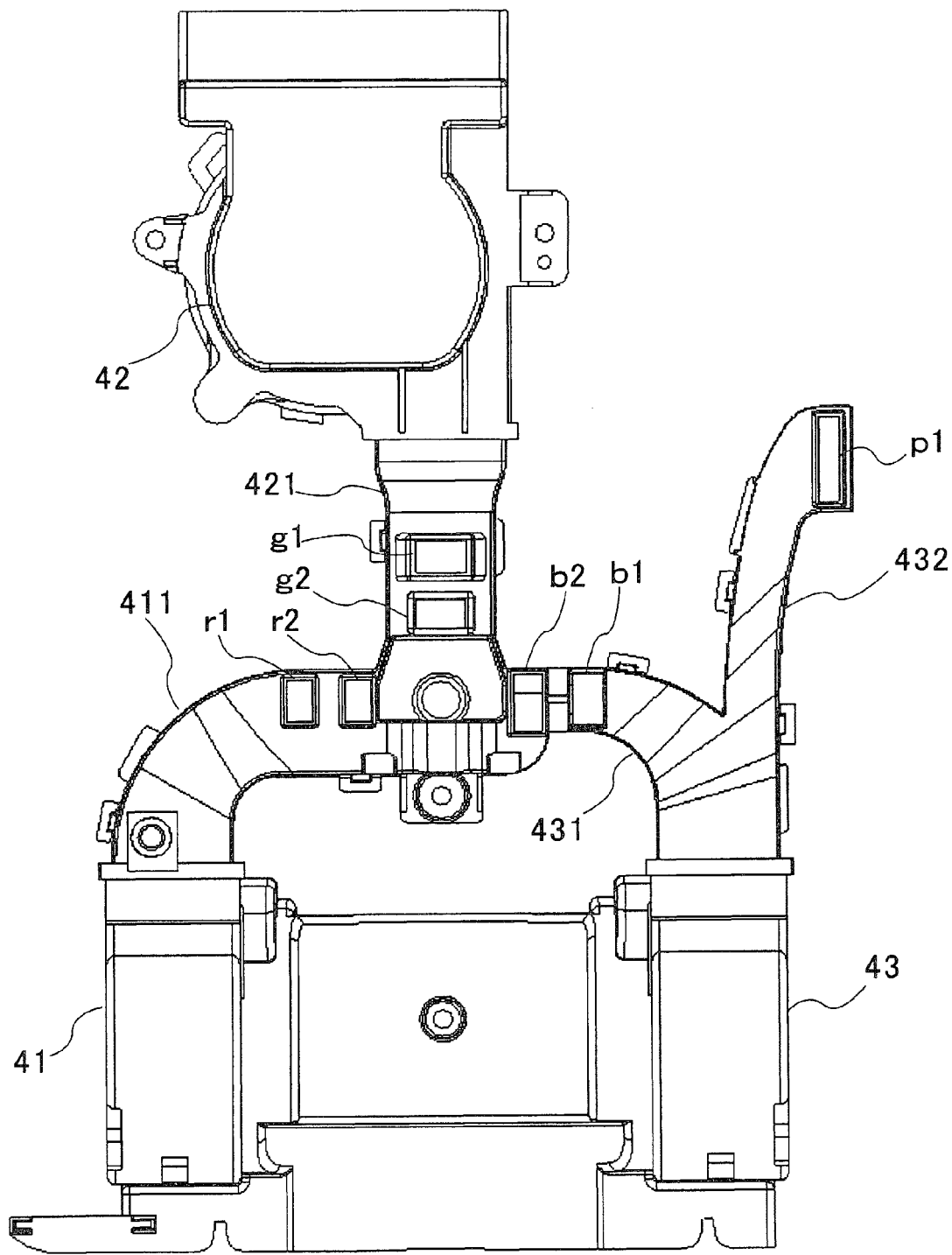
FIG. 14 is similarly a top plan view in which the optical parts are removed.
Figure 15:
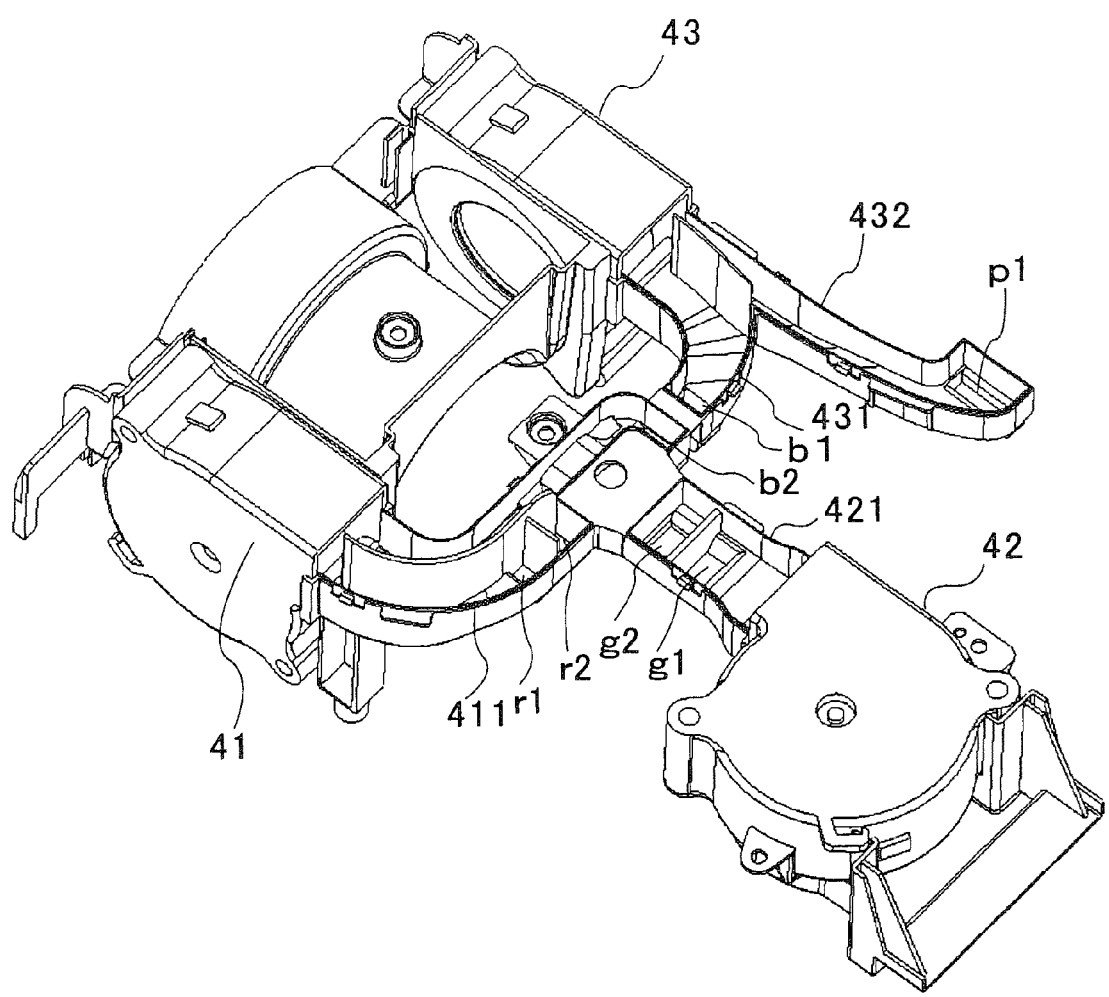
FIG. 15 is similarly a back side view in which the lower half of the duct is removed.

FIGS. 12 to 15 are enlarged views of the principal parts showing an optical part cooling mechanism in the present embodiment. FIG. 12 is a perspective view seen obliquely from above from the front side, FIG. 13 is a top plan view, FIG. 14 is a top plan view in which optical parts such as the liquid crystal panels and the like are removed, and FIG. 15 is a back view in which the lower half of the duct is removed.

As explained earlier, heretofore, there has been known a device cooling three pieces of liquid crystal panels corresponding to a red light, a green light, and a blue light and polarizing plates disposed at the incident side and the outgoing side of each liquid crystal panel by one set of the fan every color, that is, by a total of three sets of the fans.

Meantime, three pieces of the liquid crystal panels corresponding to the red light, the green light, and the blue light, and the polarizing plates and the like disposed at the incident side and the outgoing side of each liquid crystal panel are different in temperature rise and degree of ultraviolet deterioration every color, and therefore, the required cooling amount is also different. Particularly, since the blue light is close to the ultraviolet region, to avoid the ultraviolet deterioration, the required amount of cooling becomes large.

The projection type image display apparatus such as a liquid crystal projector and the like has come to require the enhancement of luminance by the raised output of the light source lamp, the miniaturization of the apparatus, and a reduced cost (miniaturization of the liquid crystal panel and the like) all together, and the amount of light per unit area of high luminance has come to be increased.

However, the conventional art that performs cooling by one set of the fan for each color has been unable to cope with the model whose amount of light per unit of high luminance has come to be increased. As a countermeasure, when the output of the fan (the number of rotations) is increased, the noise of the fan is increased. Further, the cooling of the PBS needs to be also performed.

Hence, in the present embodiment, the incident side and the outgoing side of each of the liquid crystal panels 34r, 34g, and 34b are formed with discharge ports r1 and r2, g1 and g2, and b1 and b2 to discharge the air from three sets of suction fans 41, 42, and 43 through ducts 411, 421, and 431. At the same time, the PBS 23 is formed with a discharge port p1 to discharge the air from the suction fan 43 through the duct 432. An incident side discharge port b1 and an outgoing side discharge port p2 of the liquid crystal panel 34b corresponding to the blue color are formed with a duct so as to discharge the air from the suction fans 43 and 41 which are different from each other. Incidentally, each of the suction fans 41 to 43 is composed of the sirocco fan.

That is, the duct is configured such that, by one set of the suction fan 43, the air is sent to the incident side discharge port b1 of the liquid crystal panel 34b corresponding to the blue light and the discharge port p1 of the PBS 23, and by the other two sets of the suction fans 41 and 42, the air is sent to the incident side discharge ports r1 and g1 of each of the liquid crystal panels 34r and 34g, to the outgoing side discharge port r2 and g2 corresponding to the red light and the green light, and to the outgoing side discharge port b2 of the liquid crystal panel 34b corresponding to the blue light.

To explain more specifically, the duct is configured such that, by one set of the suction fan 42 from among two sets of the suction fans 41 and 42, the air is sent to the incident side discharge port g1 and to the outgoing side discharge port g2 of the liquid crystal panel 34g corresponding to the green light through the duct 421, and by the other set of the suction fan 41, the air is sent to the incident side discharge port r1 and to the outgoing side discharge port r2 of the liquid crystal panel 34r corresponding to the red light and the outgoing side discharge port b2 of the liquid crystal panel 34b corresponding to the blue light by extending the duct 411.

By being thus configured, by three sets of the suction fans 41 to 43, the incident side and the outgoing side of each of the liquid crystal panels 34r, 34g, and 34b in addition to the PBS 23 can be cooled. The incident side and the outgoing side of the blue light which is large in required cooling amount can be sufficiently cooled by using the suction fans 43 and 41 which are different from each other. Consequently, even when the amount of light per unit area of high luminance is increased, without increasing the output (the number of rotations) of the suction fans 41 to 43 so much, the liquid crystal panels 34r, 34g, and 34b, and the polarizing plates 36r, 36g, 36b, 37g, 37b, 38r, 38g, and 38b, and the PBS 23 can be cooled by three sets of the suction fans 41 to 43, thereby reducing the noise also.

Further, the duct is configured such that, by one set of the suction fan 43, the air is sent to the incident side discharge portion b1 of the liquid crystal panel 34b corresponding to the blue light and to the discharge port p1 of the PBS 23, and by the other two sets of the suction fans 41 and 42, the air is sent to the incident side discharge ports r1 and g1, to the outgoing side discharge ports r2 and g2 of each of the liquid crystal panels 34r and 34g corresponding to the red light and green light, and to the outgoing side discharge port b2 of the liquid crystal panel 34b corresponding to the blue light, so that, in the system disposed with the liquid crystal panel 34b of the blue light at the PBS 23 side similarly to the optical system 13 of the present embodiment, by the shortest duct configuration, the above explained effect can be realized. Further, by the suction fan 41 for red light that increases least in temperature, the air can be sent to the outgoing side discharge port b2 of the liquid crystal panel 34b corresponding to the blue light. Incidentally, if the suction fan for the green light that increases most in temperature is not enough with one set of the suction fan 42, the air may be sent from the suction fan 41 for red light.

Similarly to the present embodiment, the duct is configured such that, by one set of the suction fan 42 from among the two sets of suction fans 41 and 42, the air is sent to the incident side discharge port g1 and to the outgoing side discharge port g2 of the liquid crystal panel 34g corresponding to the green light, and by another one set of the suction fan 41, the air is sent to the incident side discharge port r1, to the outgoing side discharge port r2 of the liquid crystal panel 34r corresponding to the red light, and to the outgoing side discharge port b2 of the liquid crystal panel 34b corresponding to the blue light, so that the above explained effect can be realized without the duct configuration becoming complicated.

Thus, according to the present embodiment, since the apparatus is provided with the optical part cooling mechanism as explained above, even when the amount of light per unit area of high luminance is increased, without increasing the output (the number of rotations) of the fan so much, the liquid crystal panel and the polarizing plate as well as the PBS can be cooled by three sets of the fans, so that the liquid crystal projector 1 capable of reducing the noise can be realized.

Next, the power source unit of the present embodiment will be explained.

Heretofore, it has been common to mount a noise removal filter portion on the circuit substrate of the power source unit.

As explained above, the projection type image display apparatus such as a liquid crystal projector and the like has come to require the enhancement of luminance by the raised output of the light source lamp, the miniaturization of the apparatus, and a reduced cost all together, and because of the raised output of the light source lamp, the power source unit has also come to require a large output.

However, in the case of the model having a small output, even when the noise removal filter is mounted on the circuit substrate of the power source unit similarly to the conventional art, this does not cause a problem. However, when the output becomes large, a noise removal filter portion having a core (coil) incapable of being miniaturized becomes large, thereby upsizing the power source unit.

When the power source unit becomes large, the fan that cools this power source unit also becomes large, and the output (the number of rotations) is required to be increased. This results in lowering of the cooling performance and making the noise large. As its countermeasure, though it is conceivable to separate the noise removal filter portion and make it into a separate type, a noise is liable to enter the connecting line, and because of the increased use of the core, the EMC (ElectroMagnetic Compatibility) measure becomes formidable thereby inviting a high cost.

Hence, in the present embodiment, as explained above, the noise removal filter portion 15 is separated from the power source unit main body 14, and at the same time, the separated noise removal filter portion 15 is disposed to be positioned as closely as possible to the housing back side wall provided with the power source inlet 10 and the power unit main body 14, respectively.

Specifically, along the front side wall of the horizontally long house 2, the power source unit main body 14 is disposed, and at the position opposed to the power source unit main body 14 in the back side wall, the noise removal filter portion 15 is disposed along the back side wall.

By being thus configured, even when the output of the light source lamp 19 becomes large, the power source unit main body 14 can be miniaturized, so that a reduction in the noise can be made possible by the improvement of the cooling performance. In addition, the connecting line is minimized, so that a reduction in the cost is made possible by making the EMC measure (reduction in the use of the core and the like) more effective.

Further, by disposing the noise removal filter portion 15 close to the housing back side wall provided with the power source inlet 10, a power source cord is not brought to the lateral side of the housing 2, so that the above explained effect can be obtained with the usability of the lateral side of the housing 2 not harmed.

Further, the power source unit main body 14 is disposed along the front side wall of the horizontally long house 2, and by disposing the noise removal filter portion 15 at the position opposed to the power source unit main body 14 in the back side wall, even when the noise removal filter portion 15 is disposed along the back side wall, the connecting line can be made shortest, so that the above explained effect can be obtained without making the disposal configuration of each part inside the housing 2 complicated.

Thus, according to the present embodiment, the power source unit as explained above is provided, so that even when the output of the light source lamp 19 becomes large, the liquid crystal projector 1 capable of reducing the cost by a reduction of the noise by improving the cooling performance and making the EMC measure more effective can be realized.

Incidentally, in the present embodiment, since the housing 2 is horizontally long, even when the power source unit main body 14 and the noise removal filter portion 15 are arranged in parallel along the front side wall and the back side wall, respectively, the connecting line can be made shortest, while in the case of the housing vertically long front to back, the disposition as explained above is unable to make the connecting line shortest, and therefore, in this case, for example, if the noise removal filter is disposed front and back, then, it is possible to dispose the noise removal filter portion close to the housing back side wall and the power source unit main body, respectively.

Next, the exhaust mechanism in the present embodiment will be explained.

Heretofore, there has been known the exhaust mechanism placed with two sets of exhaust fans side by side close to the light source lamp, the exhaust fans exhausting the exhaust air to the outside from the light source lamp, the power source unit, and the like.

As explained above, while the projection type image display apparatus such as the liquid crystal projector has come to require the raised output of the light source lamp and the miniaturization of the apparatus all together. The exhaust air of high temperature from the high output light source lamp is exhausted, but a reduction in the exhaust temperature and a reduction in the noise of the exhaust fan have become a key issue.

However, to achieve a reduction in noise of the side by side exhaust fans installed by the conventional art as explained above, a space needs to be left between the fan and the housing side wall, and this hinders the miniaturization. To reduce the temperature of the exhaust air, it is conceivable to dispose each of the exhaust fans installed side by side so as to be inclined in a V shape in the mutual exhausting direction so that the exhaust air of high temperature from the light source lamp and the exhaust air of the relatively low temperature from the power source unit and the like are mixed, but even in this case also, a space therefore is required, and the miniaturization is thus hindered.

Hence, in the present embodiment, as shown in FIGS. 3, 4, and the like, the first exhaust fan 17 which mainly exhausts the exhaust air from the light source lamp 19 (light source lamp unit 12) to the outside and the second exhaust fan 18 which mainly exhausts the exhaust air from the power source unit main body 14 to the outside are horizontally installed side by side, and at the same time, the second exhaust fan 18 side end portion in the first exhaust fan 17 is moved inward, and the first exhaust fan 17 is disposed inclined such that its exhaust direction is directed to the exhaust side of the second exhaust fan 18.

The first exhaust fan 17 is disposed inclined to a large number of slit-like exhaust holes 8 formed in the housing side wall, and moreover, is disposed inclined such that the exhaust air from the exhaust holes 8 are exhausted inclined obliquely forward.

Figure 16:
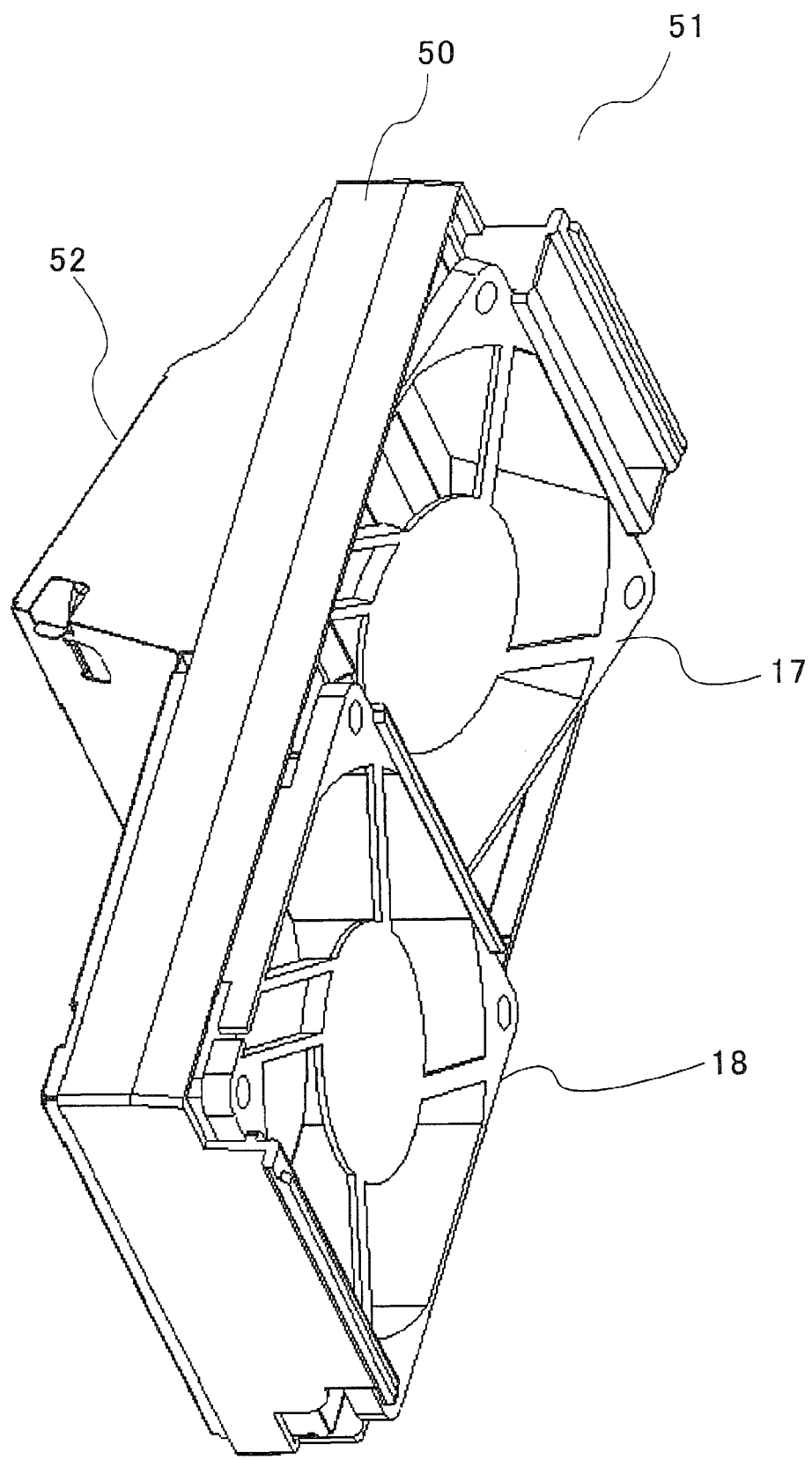
FIG. 16 is a perspective view showing an exhaust fan unit constituting an exhaust mechanism in the present invention.
Figure 17:
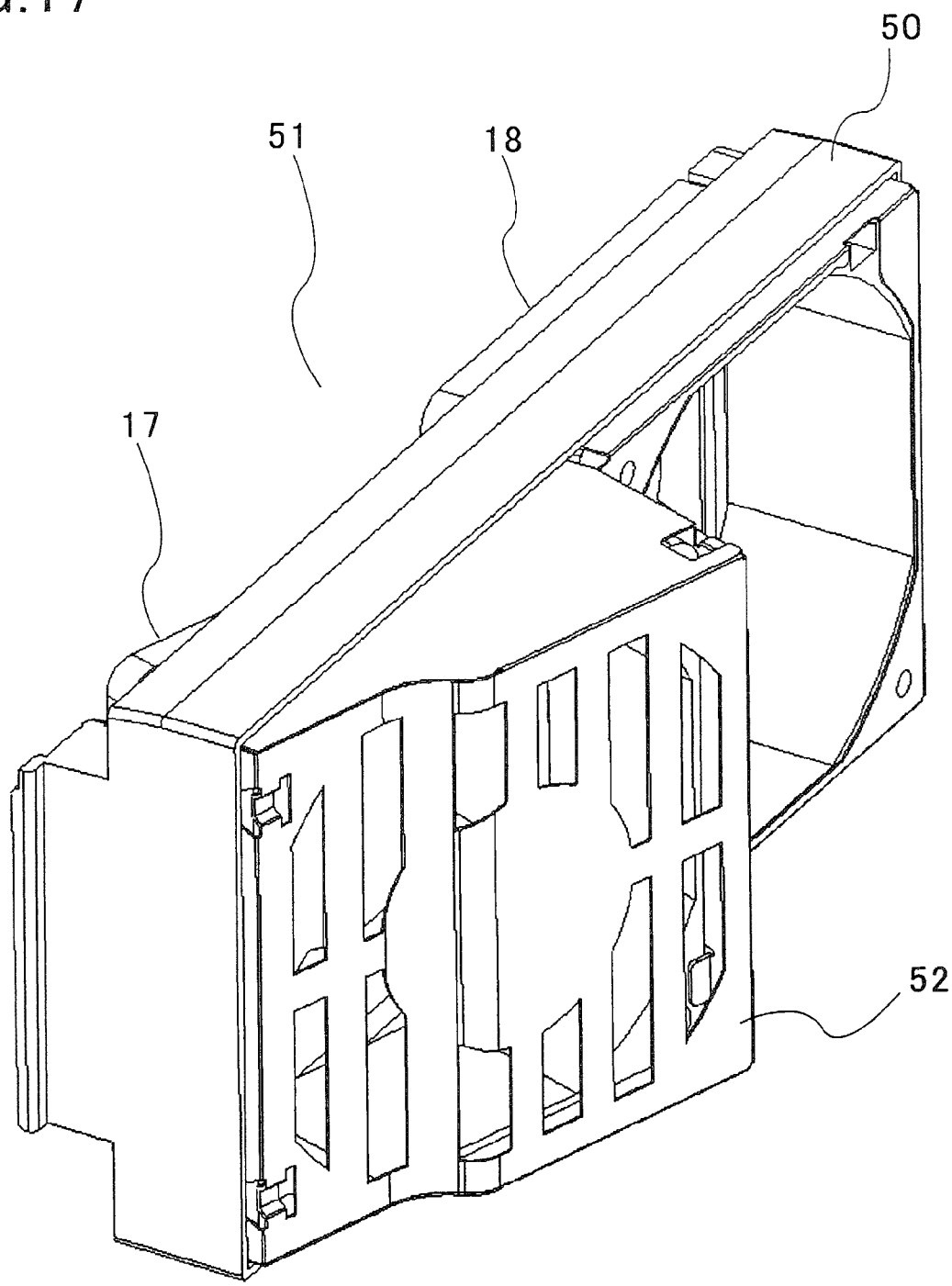
FIG. 17 is similarly a perspective view showing the back side.

The first exhaust fan 17 and the second exhaust fan 18, as shown in FIGS. 16 and 17, are fixed to a frame body 50 in advance and unitized so as to take on the above explained disposal configuration, and when this exhaust fan unit 51 is fitted to the predetermined position of the lower case 2b of the housing 2, the above explained disposal configuration can be easily realized. Incidentally, since the first exhaust fan 17 sucks down the exhaust air of high temperature from the light source lamp 19, as shown in FIG. 17, the back side is configured to be covered by a cover 52 with the center motor portion blocked and protect the motor portion from the exhaust air of high temperature from the light source lamp 19.

By being thus configured, the first exhaust fan 17 is inclined inward, so that the miniaturization is not hindered, and further, a space can be formed between the housing side wall and the first exhaust fan 17, thereby reducing the noise to a lower level. Further, the exhaust air of high temperature from the light source lamp 19 and the exhaust air of the relative low temperature from the power source unit main body 14 are mixed, thereby reducing the temperature of the exhaust air.

Since the light source lamp is brought to a high temperature, and is disposed spaced further apart from the exhaust fan than before, the above explained configuration and effect can be easily realized.

Further, since the second exhaust fan 18 exhausts the exhaust air mainly from the power source unit main body 14 to the outside, it can also simultaneously exhaust the exhaust air of the important power source unit main body 14, though not higher in temperature than the light source lamp 19.

Further, the first exhaust fan 17 which exhausts the exhaust air from the light source lamp 19 to the outside is disposed inclined to a large number of slit-like exhaust holes 8 formed in the housing side wall, so that the air in high temperature from the light source lamp 19 is exhausted obliquely from a large number of slit-like exhaust holes 8, and by that much, the exhaust air becomes hard to be exhausted, thereby to be easily mixed with the exhaust air of the relatively low temperature from the second exhaust fan 18 with a result that the exhaust air temperature can be reduced much more than before.

Further, the first exhaust fan 17 which exhausts the exhaust air from the light source lamp 19 is disposed inclined so as to exhaust obliquely frontward the exhaust air from the exhaust holes 8 formed in the housing side wall, so that the exhaust air of high temperature can be prevented from being laterally blown out to an operator and the like.

Thus, according to the present embodiment, since the exhaust mechanism as explained above is provided, the liquid crystal projector 1 capable of reducing the noises of the exhaust fans 17 and 18 and lowing the exhaust temperature, while achieving down-sizing can be realized.

Incidentally, in the present embodiment, though the first exhaust fan 17 has been inclined, if an extra room available inside space-wise, even when the second exhaust fan 18 is conversely inclined similarly to the first exhaust fan, a fixed effect can be expected.

The invention claimed is:

1. A projection image display apparatus having a noise removal filter portion for removing noise coming via a power source inlet and comprising a power source unit for supplying power to the respective parts including a light source lamp stored in a housing, which modulates light emitted from the light source lamp based on an image signal to project the modulated image light in an expanded manner,
   wherein the noise removal filter portion is provided within the housing is separated from the body of the power source unit and the separated noise removal filter portion is provided in the vicinity of a side wall of the housing on which the power source inlet is provided, and of the body of the power source unit, respectively.

2. The projection image display apparatus according to claim 1, wherein the noise removal filter portion is provided in the vicinity of a side wall of a back face of the housing on which the power source inlet is provided, and of the body of the power source unit, respectively.

3. The projection image display apparatus according to claim 2, wherein the body of the power source unit is provided along a side wall of a front face of the horizontally-long housing and the noise removal filter portion is provided in a position opposed to the body of the power source unit in the side wall of the back face.

* * * * *